United States Patent [19]

Burdett et al.

[11] Patent Number: 6,135,280

[45] Date of Patent: *Oct. 24, 2000

[54] LOCKABLE MEDIA STORAGE BOX WITH LOCK AND KEY

[75] Inventors: Ronald K. Burdett, Strasburg; Dennis D. Belden, Jr., Canton; Nicholas M. Sedon, Massillon, all of Ohio

[73] Assignee: Alpha Enterprises, Inc., North Canton, Ohio

[*] Notice: This patent is subject to a terminal disclaimer.

[21] Appl. No.: 09/317,554

[22] Filed: May 24, 1999

Related U.S. Application Data

[63] Continuation of application No. 09/015,085, Jan. 29, 1998, Pat. No. 5,944,185.

[51] Int. Cl.⁷ .................................................. B65D 85/575
[52] U.S. Cl. ...................................... 206/387.11; 206/807
[58] Field of Search .............................. 206/1.5, 308.2, 206/387.11, 472, 807

[56] References Cited

U.S. PATENT DOCUMENTS

| | | | |
|---|---|---|---|
| 4,469,225 | 9/1984 | Takahashi | 206/387 |
| 4,658,955 | 4/1987 | Eichner | 206/1.5 |
| 4,753,347 | 6/1988 | Bellante | 206/472 |
| 4,871,064 | 10/1989 | Hehn et al. | 206/472 |
| 5,390,515 | 2/1995 | Essick | 206/1.5 |
| 5,460,266 | 10/1995 | Mundorf et al. | 206/309 |
| 5,528,914 | 6/1996 | Nguyen et al. | 70/57.1 |
| 5,601,188 | 2/1997 | Dressen et al. | 206/308.2 |
| 5,636,535 | 6/1997 | Shimada | 206/387.11 |
| 5,762,187 | 6/1998 | Belden, Jr. et al. | 206/387.11 |
| 5,823,341 | 10/1998 | Nakasuji | 206/387.11 |

*Primary Examiner*—David T. Fidei
*Attorney, Agent, or Firm*—Sand & Sebolt

[57] ABSTRACT

A lockable media storage box and lock and key combination includes a box having a base and a lid hingedly connected to the base and movable between opened and closed positions. A locking tab extends from the lid. The locking tab has a first hole therein. The base has a second hole therein. The first and second holes are aligned when the lid is in the closed position. A lock having at least one locking finger and at least one locking pin is attachable to the box by the locking finger. When the lock is attached to the box, the locking pin is disposed in the first and second holes to the prevent lid from being opened. Lock carries an EAS tag in a manner such that it cannot be easily removed.

12 Claims, 13 Drawing Sheets

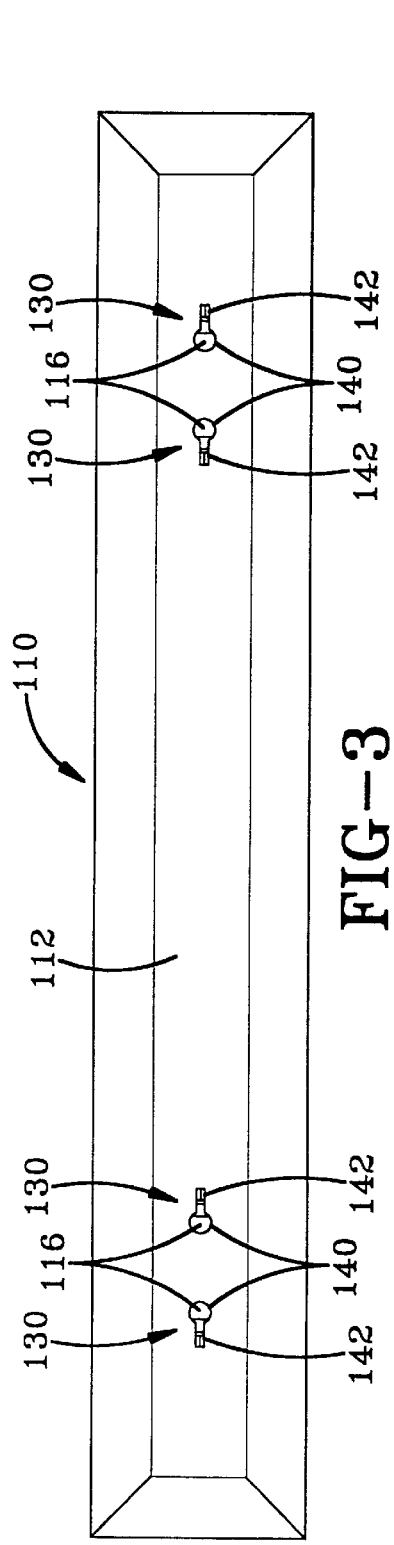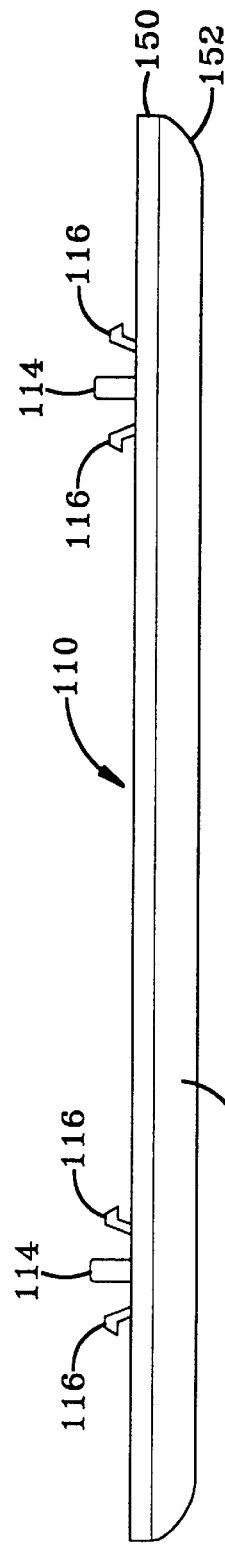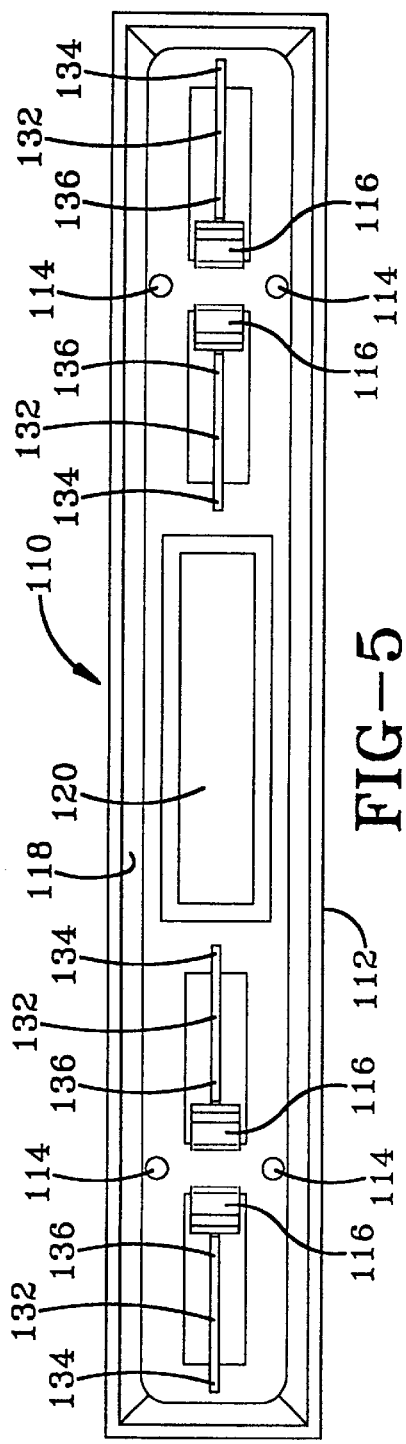

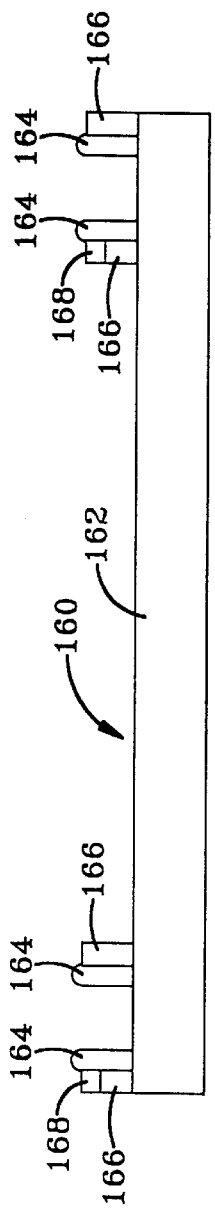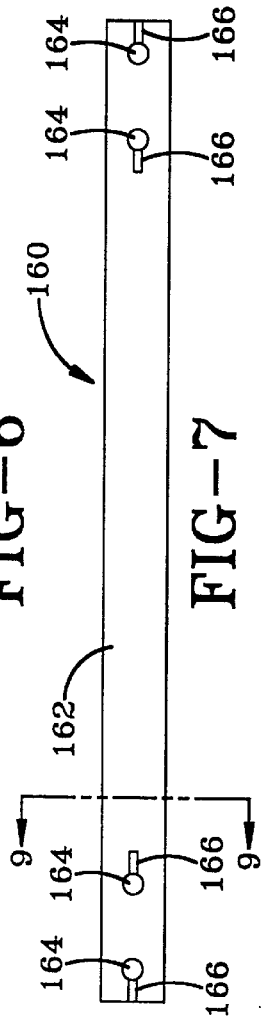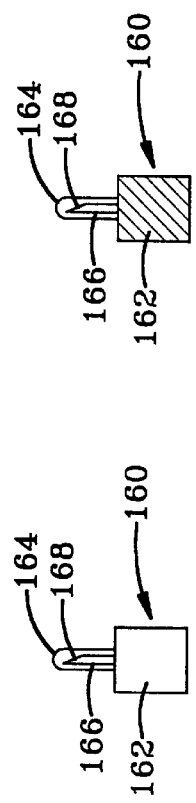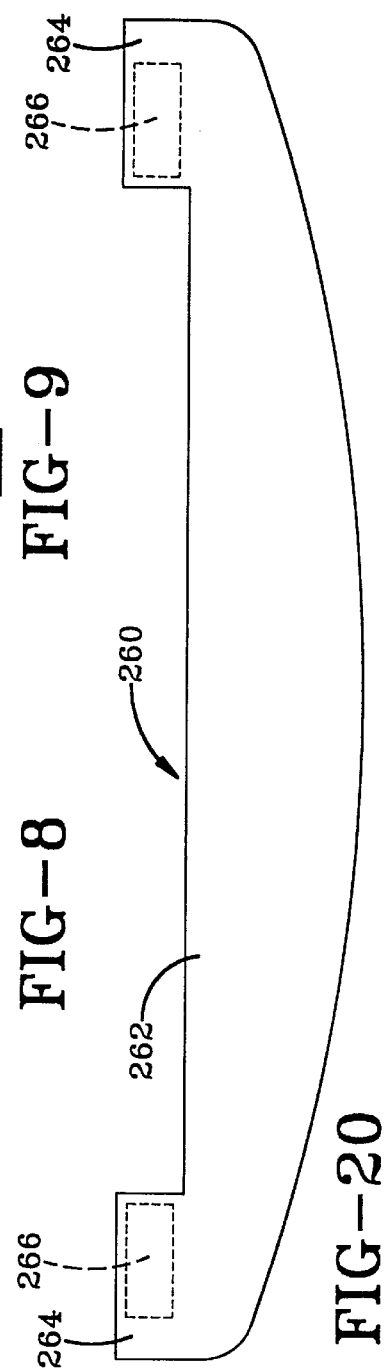

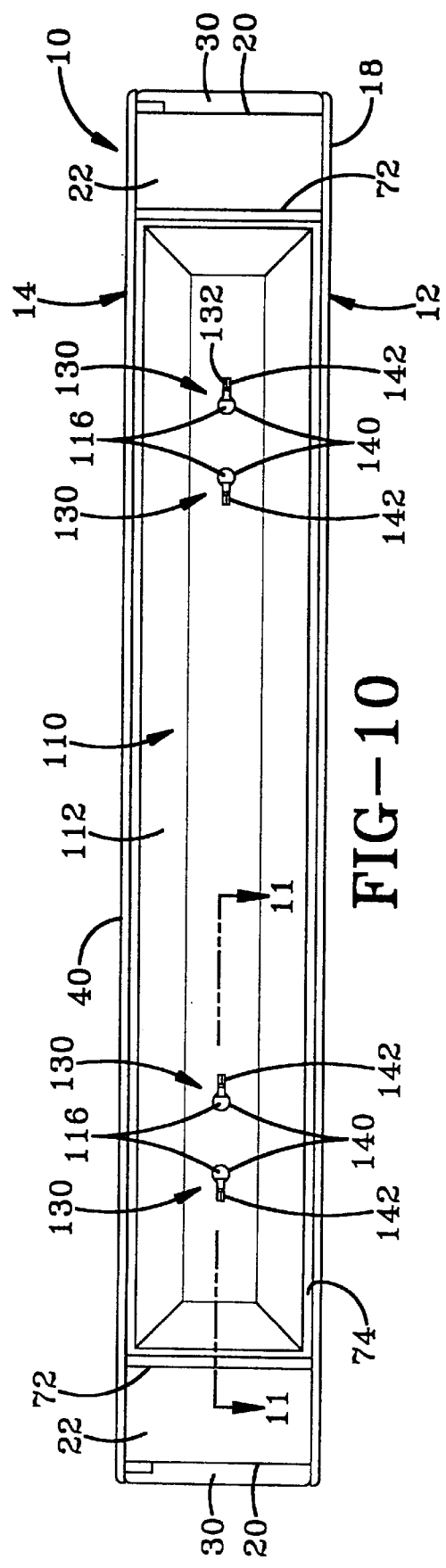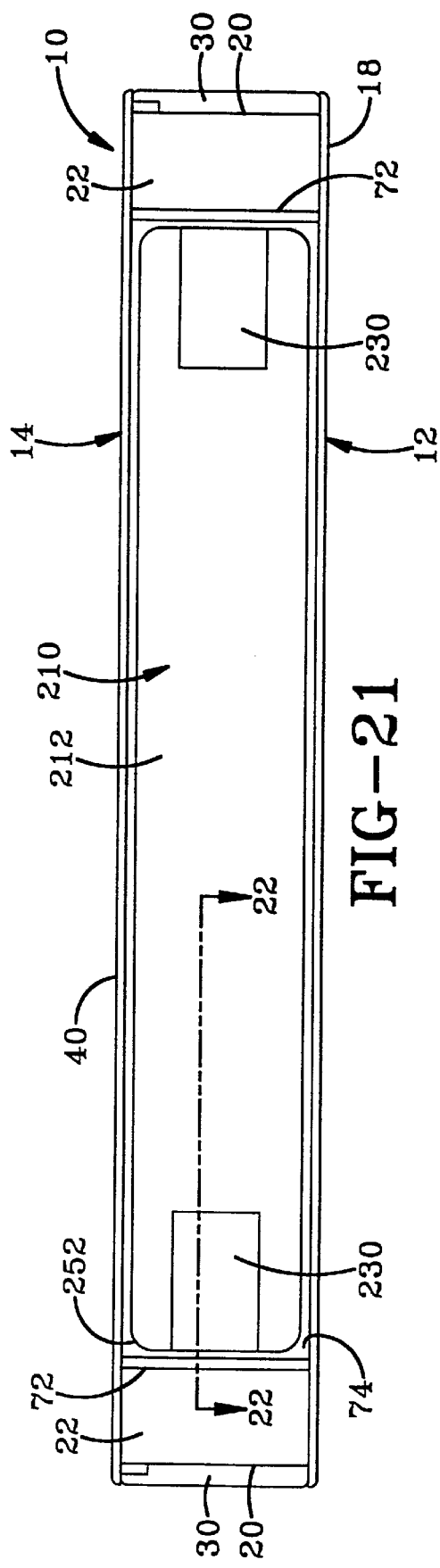

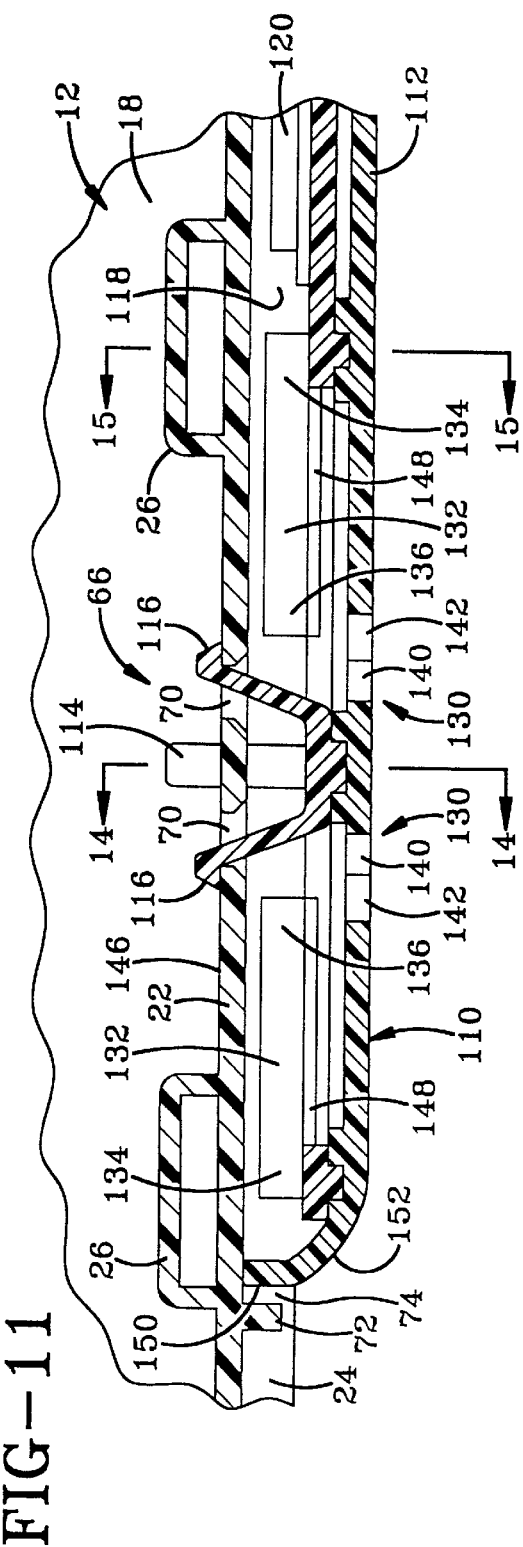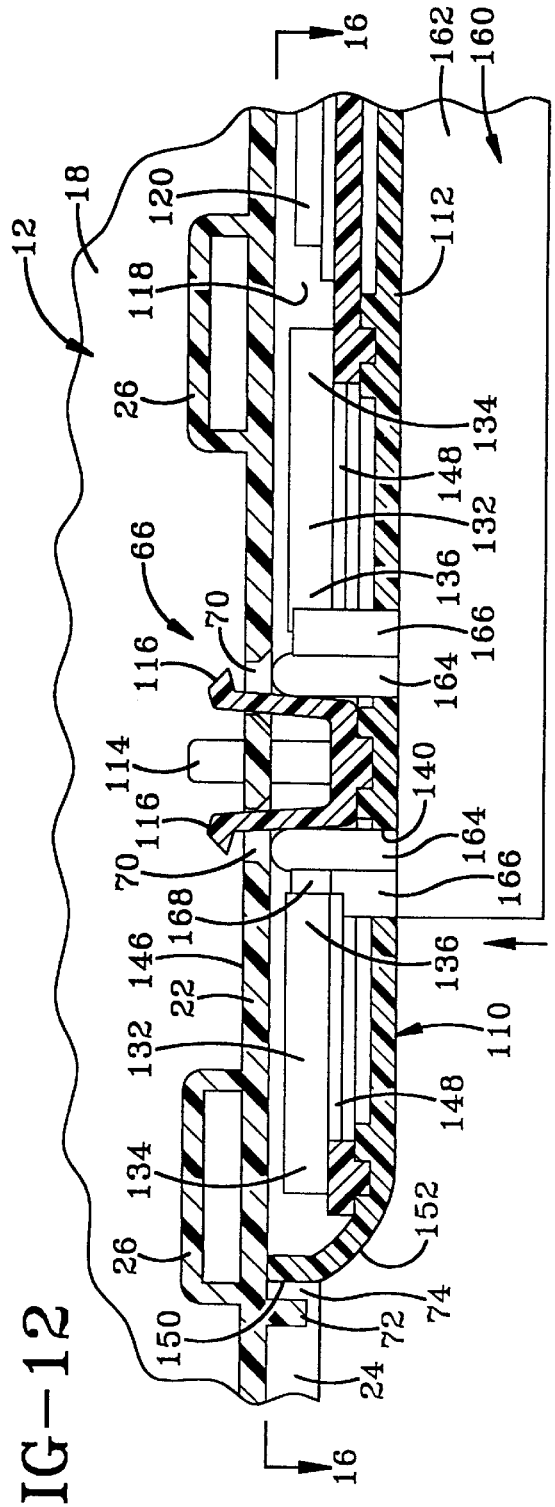

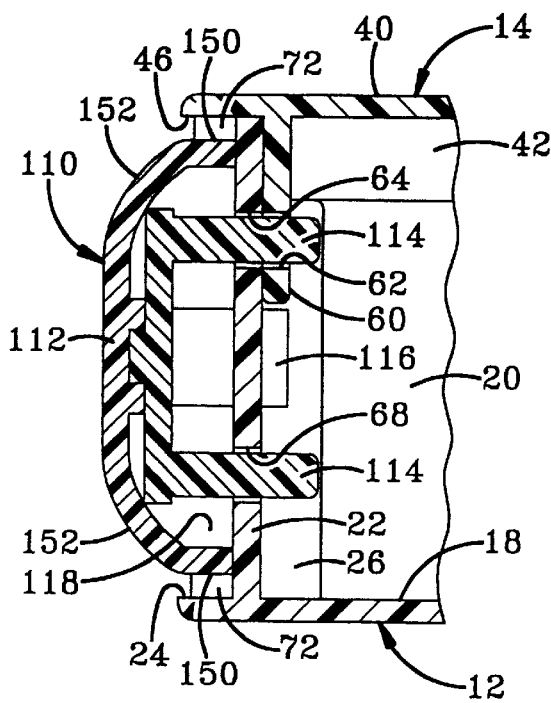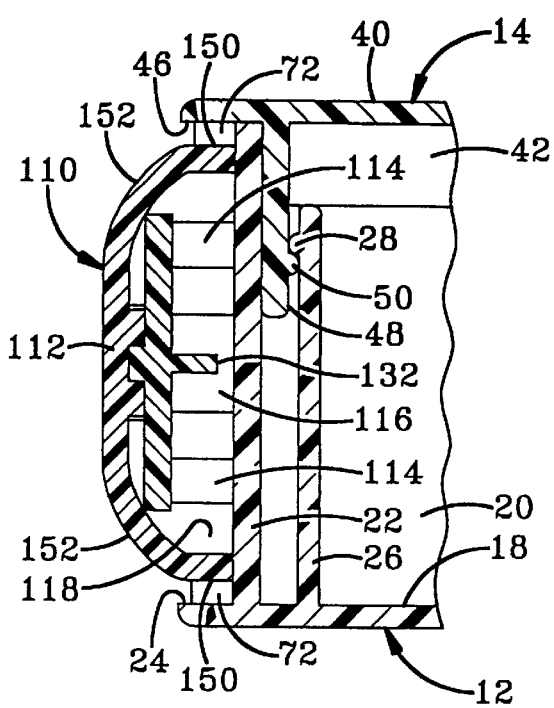
FIG-14  FIG-15
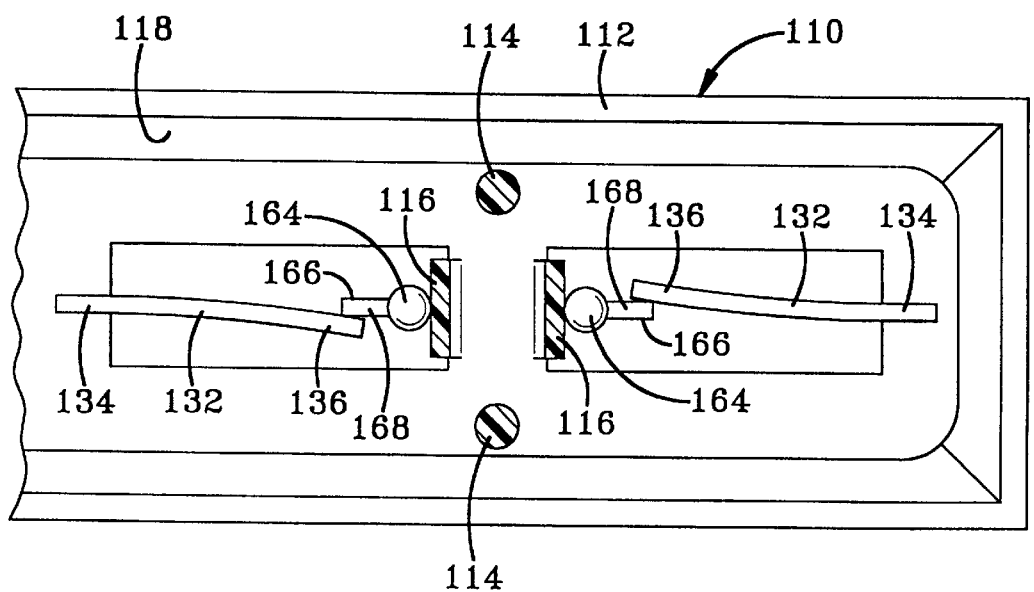
FIG-16

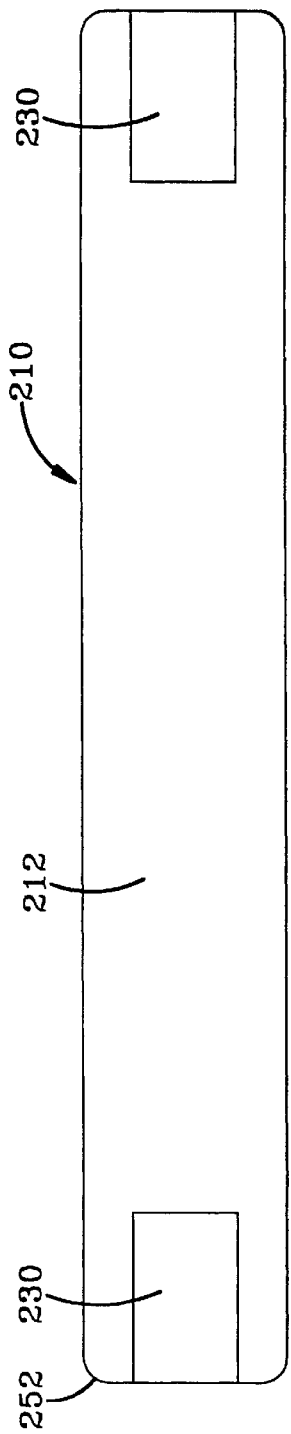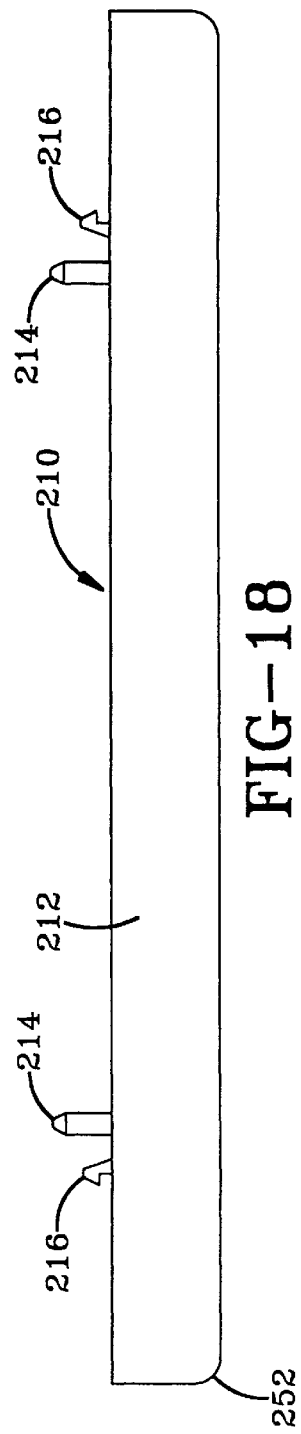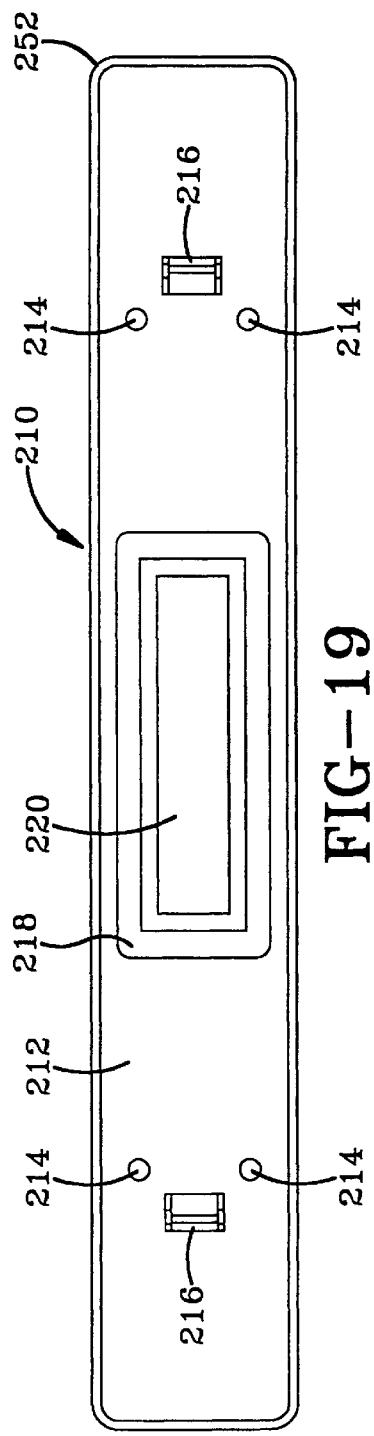

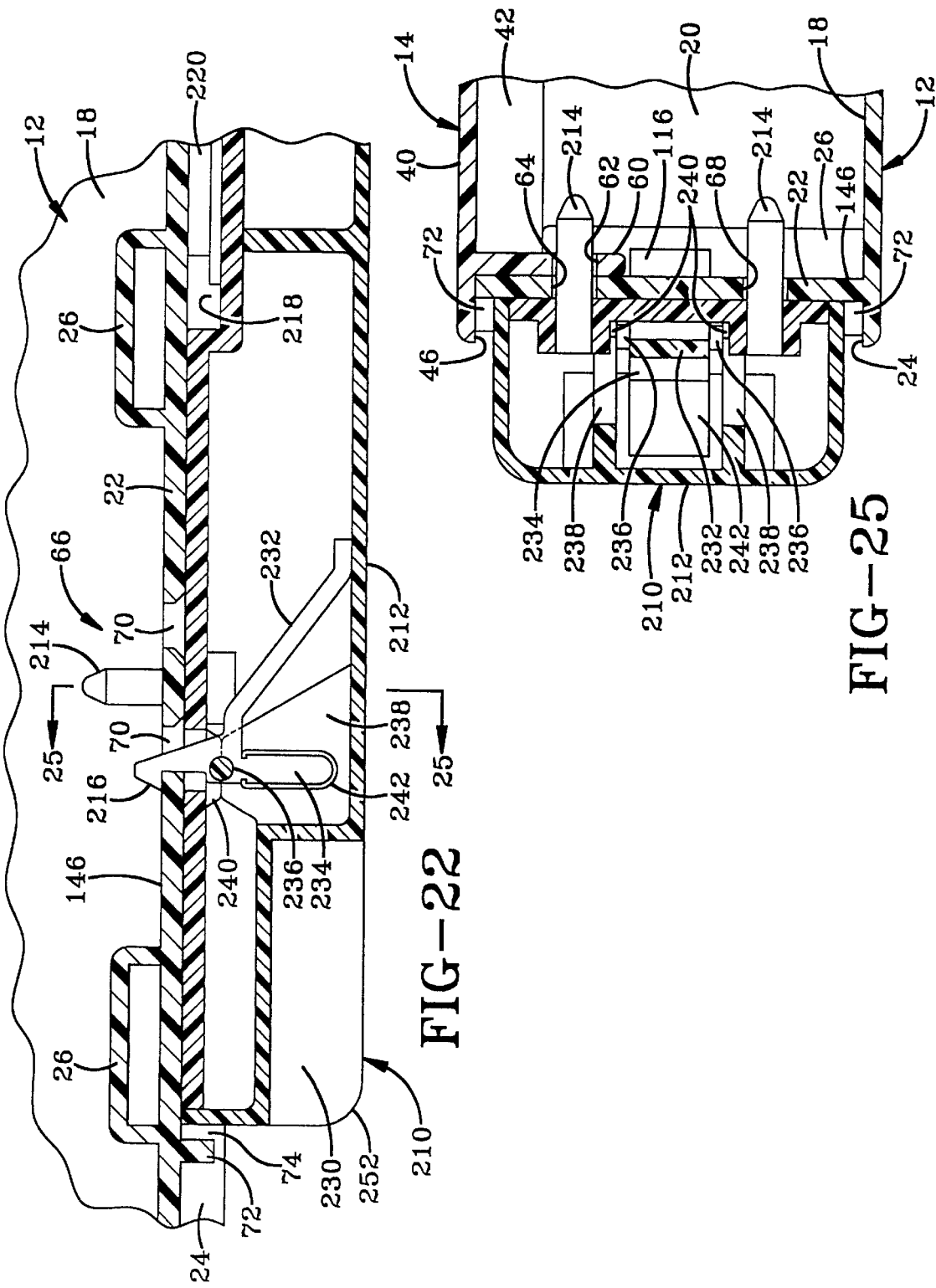

LOCKABLE MEDIA STORAGE BOX WITH LOCK AND KEY

CROSS REFERENCE TO RELATED APPLICATIONS

This application is a continuation application of copending application Ser. No. 09/015,085, filed Jan. 29, 1998, now U.S. Pat. No. 5,944,185 the disclosures of which are incorporated herein by reference.

BACKGROUND OF THE INVENTION

1. Technical Field

The present invention is directed generally to a storage box for an item of recorded media and a lock and key combination for the box. More particularly, the present invention is directed to a storage box and lock and key combination suitable for holding an item of recorded media that is commonly repeatedly rented prior to being offered for sale. Specifically, the present invention is directed to a storage box for an item of recorded media that holds the item while it is repeatedly rented and is configured to receive a lock carrying an EAS (electronic article surveillance) tag when the item of recorded media is offered for sale.

2. Background Information

Renting items of recorded media such as video cassettes and video games has become immensely popular in recent times given the ever increasing number of items available for home viewing and use as well as the decrease in price of the machines that play the media. Typical rental stores display the items available for rental in storage boxes that protect the items from dust, ultraviolet light, and damage from impact if accidentally dropped. Stores protect themselves against theft by placing one or more EAS tags on or inside the item of recorded media. An EAS tag is adapted to activate an alarm when passed through a sensing device that may be disposed around the exit of the store. It is generally desirable to place the EAS tags in places where they cannot be easily removed by a shoplifter.

A rental establishment typically places older rental stock out for sale when it no longer needs the item for rental. When items are put out for sale, the EAS tags are removed from the items and reused on items that are being rented. The EAS tags are removed from the items of recorded media prior to sale so that the purchaser will not activate the alarm systems in other stores with the EAS tags. Without the EAS tags in the items themselves, a rental store must protect itself against shoplifting by placing an EAS tag on the storage container holding the item for sale. It is desirable that the EAS tag be placed on the storage container in a way that allows a sales clerk to quickly and easily remove the tag after the sale is made but also in a manner that prevents a shoplifter from easily removing the tag. Placement of the EAS tag in such a position is, however, difficult because a storage container provides few, if any, areas where the EAS tag may be hidden. If the EAS tag is placed on the storage container in a fashion such that it can be easily removed, a shoplifter may simply remove the tag and steal the item without activating the alarm. It is thus desired in the art to provide a storage container suitable for holding and displaying an item of recorded media during display for rental that has locking holes that can later accept a lock containing an EAS tag when the container is used to sell an item.

Such a storage box and lock combination must be configured to prevent the thief from simply breaking the lock off the storage box with a small pry bar. Although the storage box and lock must be relatively strong, the cost of manufacturing the lock and storage box must not be prohibitive. It is thus also desired in the art to provide a relatively inexpensive storage box and lock and key combination that securely locks the storage box while preventing a pry bar from being inserted between the lock and the storage box.

SUMMARY OF THE INVENTION

In view of the foregoing, a principal objective of the present invention is to provide a lockable media storage box having locking holes that are configured to selectively accept a lock.

Another objective of the present invention is to provide a lockable media storage box having locking holes that may be used with different types of locks.

Yet another objective of the present invention is to provide a lockable media storage box that is configured to prevent a pry bar from being inserted between the base of the lock and the rental box.

A further objective of the present invention is to provide a lockable media storage box having a lock that may carry an EAS tag in a position where the EAS tag may not be easily removed from the lock without first removing the lock from the media rental box.

Still a further objective of the present invention is to provide a lockable media storage box and lock combination having a minimized overall outer dimension that allows storage and display space to be used efficiently.

Another objective of the present invention is to provide a lockable media storage box and lock combination that includes visual elements that make the lock appear more complicated to open than it actually is.

A further objective of the present invention is to provide a lockable media storage box and lock combination wherein the lock may be properly placed in locking engagement with the storage box in more than one orientation.

Another objective of the present invention is to provide a lockable media storage box and lock and key combination wherein the key may be properly engaged with the lock in more than one orientation.

A further objective of the present invention is to provide a lockable media storage box and lock and key combination that is of simple construction, which achieves the stated objectives in a simple, effective, and inexpensive manner, in which solves the problems and which satisfies the needs existing in the art.

These and other objectives and advantages are obtained by the lockable media storage box of the present invention, the general nature of which may be stated as including a base; a lid hingedly connected to the base movable between open and closed positions; at least one locking tab extending from the lid; the locking tab having a first hole therein; the base having a second hole therein; and the first locking hole being aligned with the second locking hole when the lid is in the closed position.

Other objectives and advantages of the invention are obtained by a lockable media storage box and lock combination, the general nature of which may be stated as including a box having a base and a lid hingedly connected to the base movable between open and closed positions; at least one locking tab extending from the lid; the locking tab having a first hole therein; the base having a second hold therein; the first locking hole being aligned with the second locking hole when the lid is in the closed position; the lock having at least one locking finger and at least one locking pin; the lock being connectable to the box by the locking finger; and the locking pin being disposed in the first and second locking holes when the lock lockingly engages the box with the lid in the closed position.

BRIEF DESCRIPTION OF THE DRAWINGS

The preferred embodiments of the invention, illustrative of the best modes in which the Applicants contemplated applying the principles of the invention, are set forth in the following description and are shown in the drawings and are particularly and distinctly pointed out and set forth in the appended claims.

FIG. 3 is a front view of the first embodiment of lock for the media storage box of FIG. 1;

FIG. 4 is a top view of the lock depicted in FIG. 3;

FIG. 5 is a rear view of the lock depicted in FIG. 3;

FIG. 6 is a top view of a key for the lock depicted in FIG. 3;

FIG. 7 is a rear view of the key depicted in FIG. 6;

FIG. 8 is a side view of the key depicted in FIG. 6 taken from the left side;

FIG. 9 is a sectional view taken along line 9—9 of FIG. 7;

FIG. 10 is a front view of the first embodiment of the lock in locked engagement with the media storage box depicted in FIG. 1;

FIG. 11 is a sectional view taken along line 11—11 of FIG. 10 showing the locking fingers of the lock engaged with the locking holes of the media storage box;

FIG. 12 is a section view similar to FIG. 11 with the key of FIG. 6 in a fully engaged position having moved the locking fingers into a disengaged position;

FIG. 14 is a sectional view taken along line 14—14 of FIG. 11 showing the locking pins of the lock in fully engaged positions;

FIG. 15 is a sectional view taken along line 15—15 of FIG. 11 showing one of the locking tabs of the lid in a fully engaged position;

FIG. 16 is a sectional view taken along line 16—16 of FIG. 12 showing the chiseled tangs of the key engaging the cantilevered arms of the lock;

FIG. 17 is a front view of a second embodiment of a lock for the media storage box of FIG. 1;

FIG. 18 is a top view of the lock depicted in FIG. 17;

FIG. 19 is a rear view of the lock depicted in FIG. 17;

FIG. 20 is a top view of a key for the lock depicted in FIG. 17;

FIG. 21 is a front view of the second embodiment of the lock in locked engagement with the media storage box depicted in FIG. 1;

FIG. 22 is a sectional view taken along line 22—22 of FIG. 21 showing one locking finger of the lock engaging a locking hole of the media storage box;

FIG. 25 is a sectional view taken along line 25—25 in FIG. 22 showing the locking pins of the lock engaged with the locking holes of the media storage box.

DESCRIPTION OF THE PREFERRED EMBODIMENTS

Figure 1:
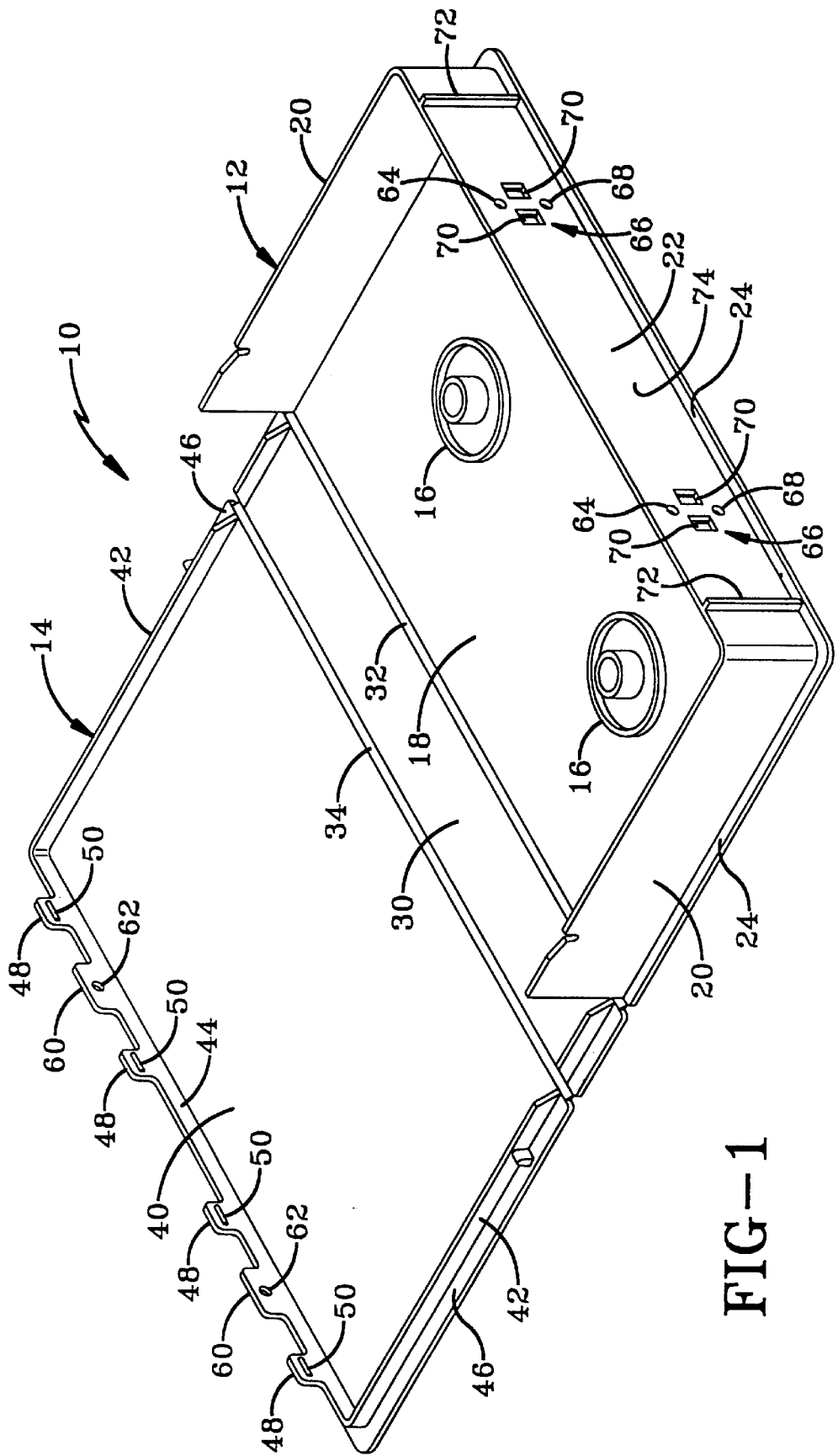
FIG. 1 is a front perspective view of an open media storage box having locking holes according to the concepts of the present invention.
Figure 2:
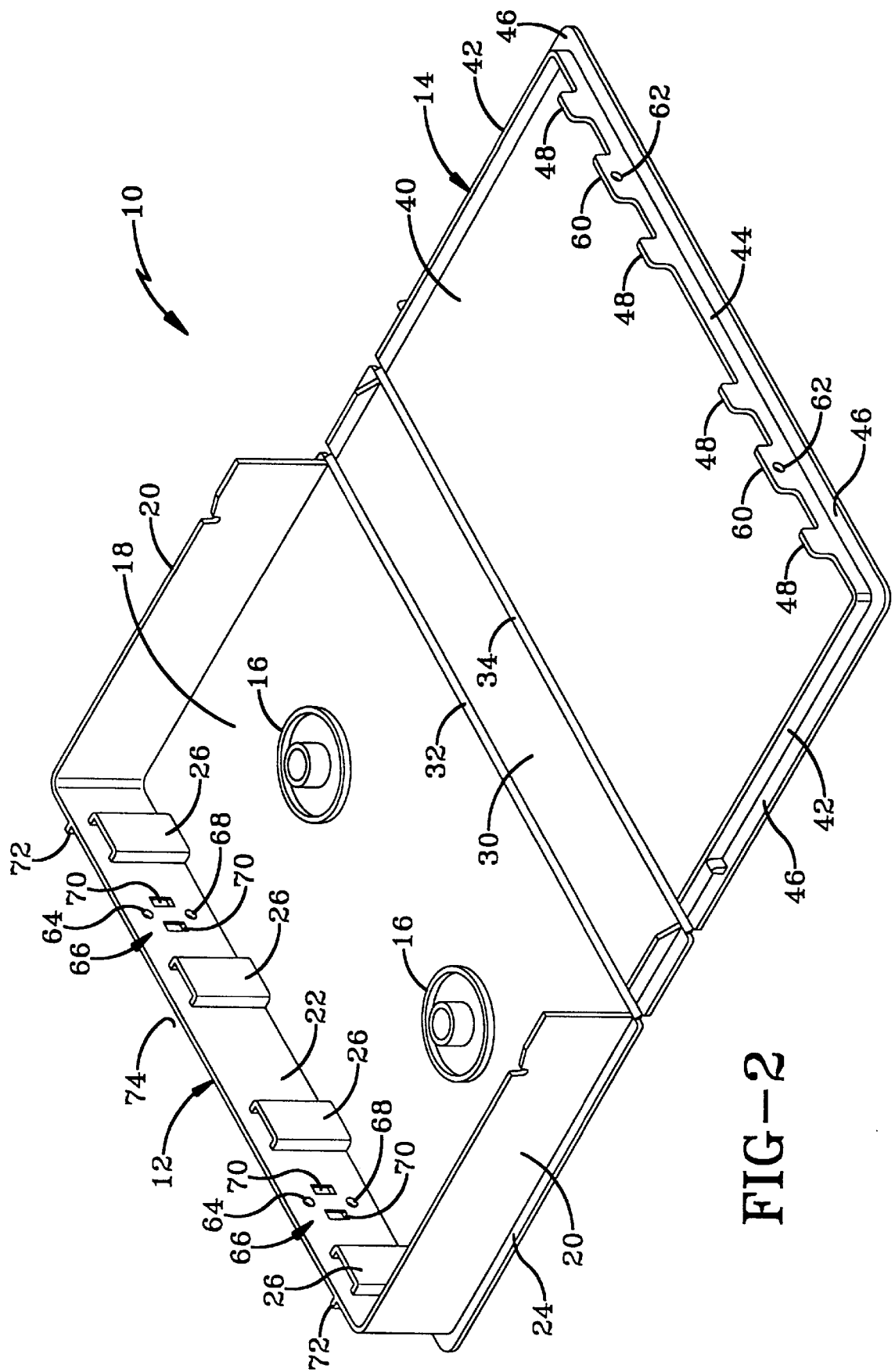
FIG. 2 is a rear perspective view of the storage box depicted in FIG. 1.

The lockable media rental box or storage container of the present invention is indicated generally at 10 in the accompanying drawings. Box 10 generally includes a base, indicated generally at 12, and a lid, indicated generally at 14, that is hingedly connected to base 12 and movable between open and closed positions. The open position is depicted in FIGS. 1 and 2 with the closed position being depicted in all of the other Figures where box 10 appears. When box 10 is in the open position, an item of recorded media (not shown) may be placed into box 10 or removed from box 10. A pair of hubs 16 may be attached to base 12 to help retain the item of recorded media when it is received in box 10. It is to be noted that the particular embodiment of box 10 depicted in the Figures is designed and configured for holding a VHS video cassette. The concepts of the present invention may be employed with a wide variety of differently shaped boxes 10 configured to hold other types of recorded media such as video game cartridges, cassette tapes, compact discs, DVD's, computer discs, and the like. The VHS video cassette embodiment being depicted only to provide an example of the present invention and to provide an embodiment on which to describe the elements of the invention and their interrelationship.

Base 12 generally includes a bottom wall 18 from which projects a pair of sidewalls 20 and a front wall 22. Sidewalls 20 are connected to front wall 22 to provide strength to box 10. Sidewalls 20 and front wall 22 are inwardly disposed from the outer perimeter of bottom wall 18 such that a lower ledge is formed by the portion of bottom wall 18 that extends beyond walls 20 and 22. Base 12 further includes at least but preferably a plurality of retaining channels 26 extending inwardly from front wall 22. Each retaining channel includes an inner protuberance 28 that may be perhaps seen in FIG. 15.

Box 10 further includes a rear wall 30 that is connected to base 12 by a first living hinge 32. Rear wall 30 is connected to lid 14 by a second living hinge 34. Both living hinges 32 and 34 are substantially continuous along the length of rear wall 30. The implementation of two hinges 32 and 34 allows rear wall 30 to be folded downwardly away from sidewalls 20 such that an item of recorded media may be more easily removed and inserted into box 10.

Lid 14 includes an upper wall 40 from which a pair of sidewalls 42 and a front wall 44 extend. Sidewalls 42 and front wall 44 of lid 14 are also disposed inwardly of the outer perimeter of upper wall 40 such that an upper ledge 46 substantially similar to lower ledge 24 is formed. Walls 42 and 44 of lid 14 are disposed inwardly slightly more than walls 20 and 22 of base 12 such that walls 42 and 44 fit inwardly of walls 20 and 22 when lid 14 is in the closed position. It is desirable that walls 42 and 44 frictionally engage walls 20 and 22 when lid 14 is in the closed position to create a frictional force that helps keep lid 14 in the closed position. In addition to this frictional force, a retaining tab 48 extends from front wall 44 of lid 14 to correspond with each retaining channel 26 of base 12. Each retaining tab 48 includes a protuberance 50 configured to cooperate with inner protuberance 28 when lid 14 is in the closed position to hold lid 14 in the closed position as depicted in FIG. 15.

In accordance with one of the primary objectives of the present invention, box 10 includes elements that enable box 10 to receive a lock that locks lid 14 in the closed position when box 10 is removed from the rental shelf and used to sell an item of recorded media. These elements include the configuration of front wall 22 and at least one locking tab 60 that extends from front wall 44 of lid 14. In accordance with one of the primary objectives of the present invention, box 10 includes at least one locking tab 60, but preferably two locking tabs 60, that extend from lid 14 with each tab 60 having a first locking hole 62 therethrough. Front wall 22 of base 12 includes a second locking hole 64 that is disposed to align with first locking hole 62 of locking tab 60 when lid 14 is in the closed position as depicted in FIG. 14. As will be discussed in more detail below, the alignment of holes 62 and 64 allows box 10 to be locked by an appropriate lock.

Wall 22 may further include a locking hole set 66 that may include second locking hole 64. Each locking hole set 66 may include a third locking hole 68 that is positioned vertically below second locking hole 64 for a purpose described in more detail below. Each locking hole set 66 may also include a pair of locking finger holes that are configured to receive a lock as is described below in more detail.

In accordance with another objective of the present invention, a pair of protection ribs 72 extend between lower ledge 24 and upper ledge 46 when lid 14 is in the closed position. Ribs 72 are disposed outward of locking hole sets 66. Protection ribs 72, lower ledge 24, and upper ledge 46 form a lock reception cavity 74 around locking hole sets 66.

It may thus be understood that box 10 is capable of holding an item of recorded media (not shown) preferably an item that is being repeatedly rented. Box 10 is further capable of storing an item of recorded media while the item is displayed for sale and is configured to receive a lock that prevents lid 14 from being opened when the lock is in place.

Figure 26:
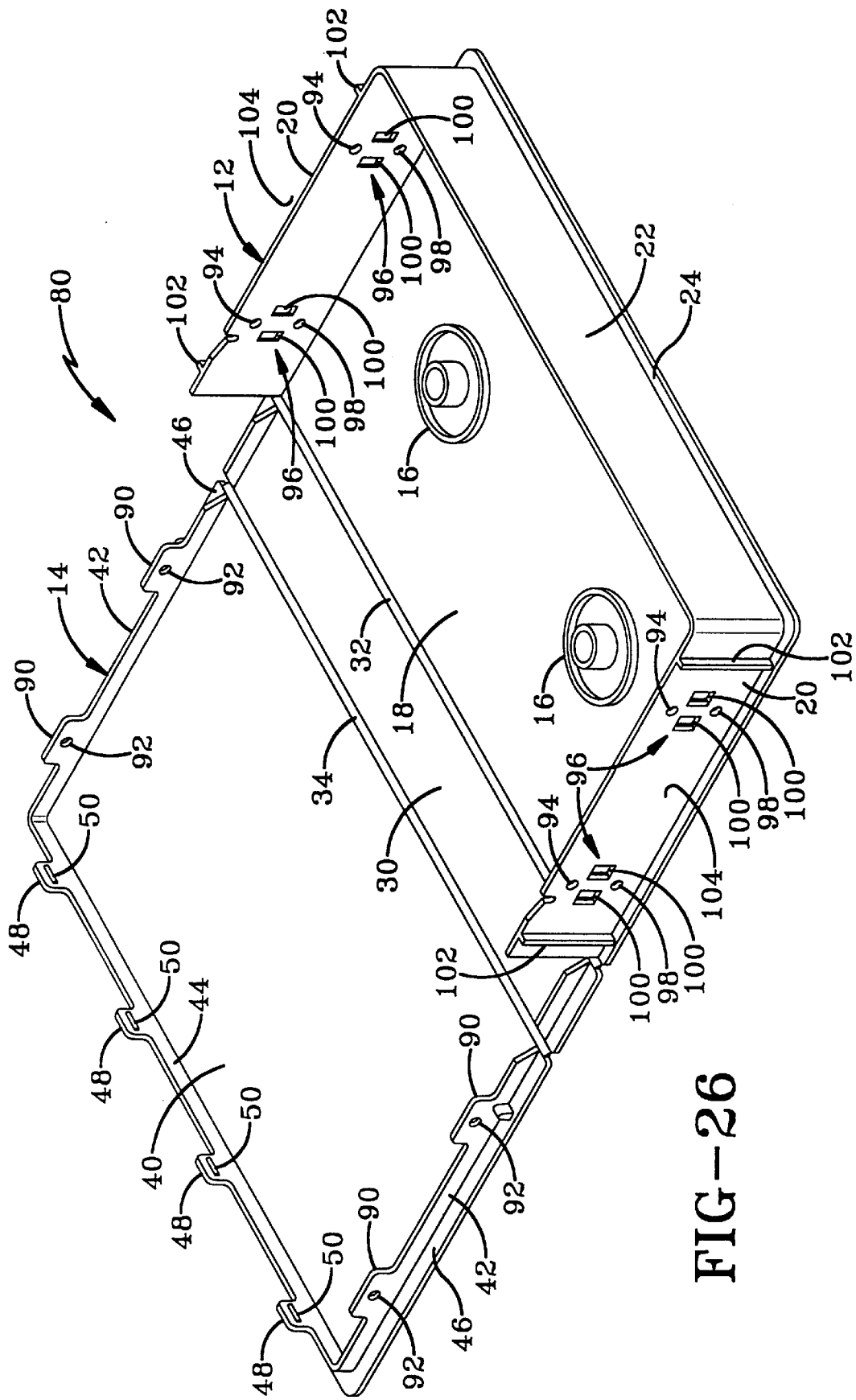
FIG. 26 is a perspective view of alternative embodiment of the media storage box having locking holes according to the concepts of the present invention.

An alternative lockable box is depicted in FIG. 26 and is indicated generally at 80. Alternative embodiment of box 80 is substantially similar to the embodiment of box 10 described in detail above and thus similar numbers are used to refer to similar parts. Box 80 includes a base 12 and a lid 14 as in the previously-described embodiment. Base 12 includes a bottom wall 18 from which extend a pair of sidewalls 20 and a front wall 22. Lid 14 is hingedly attached to base 12 by a pair of living hinges 32 and 34 and a rear wall 30.

Lid 14 includes an upper wall 40 from which a pair of sidewalls 42 and a front wall 44 extend. Both walls 20, 22, and wall 42 and 44 are disposed inwardly from the outer perimeters of bottom wall 18 and upper wall 40 to form a lower ledge 24 and an upper ledge 46. A plurality of retaining tabs 48 extend from front wall 44 and carry protuberances 50 that help frictionally engage base 12 to hold lid 14 in the closed position.

Box 80 also includes at least one locking tab 90 extending from at least one of sidewalls 42 of lid 14. Each locking tab 90 has a first locking hole 92 disposed therein. In the embodiment of box 80 depicted in FIG. 26, four locking tabs 90 extend from lid 14. In other embodiments of the present invention, locking tabs 90 may only be provided on one of sidewalls 42.

Sidewalls 20 of base 12 include a second locking hole 94 that is disposed to align with first locking hole 92 when lid 14 is in the closed position. Each second locking hole 94 is part of a locking hole set 96 that includes a third locking hole 98 and a pair of locking finger holes 100. A pair of protection ribs 102 extend outwardly from each sidewall 20 having locking hole sets 96. Protection ribs 102 cooperate with lower ledge 24 and upper ledge 46 to define a lock reception cavity 104.

It may thus be understood that box 80 provides a lockable box that is capable of holding an item of recorded media during its rental period and subsequent storage prior to sale. Box 80 is lockable when lid 14 is in the closed position causing first locking holes 92 to align with second locking holes 94. In this position, a lock may be passed through these holes preventing lid 14 from being opened.

A first embodiment of a lock for either box 10 or 80 is depicted in FIGS. 3 through 5 and is indicated generally by the numeral 110. Lock 110 generally includes a body 112, at least one locking pin 114, and at least one locking finger 116. In general, at least one locking pin 114 prevents box 10 or 80 from being opened when lock 110 lockably engages box 10 or 80. Locking fingers 116 provide the locked connection between lock 110 and box 10 or 80. Body 112 also defines a storage cavity 118. An EAS tag 120 may be disposed fully within cavity 118 such that no portion of EAS tag 120 protrudes beyond the boundaries of body 112 as may be seen in FIG. 4. Body 112 also defines a key hole 130 that is disposed in body 112 to align with each locking finger 116.

In addition to locking pins 114 and locking fingers 116, lock 110 also includes a cantilevered arm 132 having an anchored end 134 and a free end 136 disposed adjacent one of locking fingers 116. Cantilevered arms 132 provide visual deterrents to a shoplifter by making lock 110 appear more complicated to pick than it actually is by partially blocking key hole 130. It may be understood that one cantilevered arm 132 may be disposed adjacent each locking finger as depicted in the drawings but that other combinations are also contemplated by the present invention.

Each key hole 130 includes a first portion 140 that may be substantially circular as depicted in the drawings and a second portion 142 that may be rectangular as depicted in the drawings. As can be seen in FIG. 3, first portion 140 of each key hole 130 is disposed to align with a locking finger 116. It may also be seen that second portion 142 is aligned with free end 136 of cantilevered arm 132.

Each locking finger 116 and cantilevered arm 132 is fabricated to be resilient such that it may be urged away from its rest position by a force and when the force is removed they return to the at rest position depicted in FIG. 5. Locking pins 114 are preferably fabricated from a metal that may not be easily sheared but may also be fabricated from a suitable plastic. Each locking pin 114 is long enough to pass through both front wall 22 and locking tab 60 of box 10 as specifically depicted in FIG. 14. Similarly, each locking finger 116 is configured to extend into a locking finger hole 70 in front wall 22 of box 10 and engage the rear surface 146 thereof as depicted in FIG. 11. Furthermore, each cantilevered arm 132 has an angled face 148 that faces key hole 130.

In accordance with another objective of the present invention, lock 110 may not be easily pried from box 10 when lock 110 is locked onto box 10. As may be seen in FIG. 11, body 112 includes a rectangular perimeter portion 150 having a height no greater than the depth of lower ledge 24 or upper ledge 46. Body 112 further includes a slanted portion 152 that prevents a pry bar from gaining a solid grip on lock 110. It may thus be understood that lock 110 is partially disposed within lock reception cavity 74 of box 10 when lock 110 is in locked engagement with box 10. In this position, ledges 24 and 46 cooperate with protection ribs 72 to prevent a pry bar from being inserted under lock 110.

Lock 110 is placed into locked engagement with box 10 by aligning locking fingers 116 and locking pins 114 with the holes of locking hole sets 66 and pressing lock 110 against box 10. The force causes locking fingers 116 to flex inwardly and snap through locking finger holes 70 in wall 22. Holes 70 may have angled sidewalls to facilitate the engagement. Locking fingers 116 may also have angled edges that cooperate with holes 70. When locking fingers 116 are fully inserted in holes 70, they snap back outwardly and engage inner surface 146 of front wall 22. As may be seen in FIG. 11, lock 110 may not be removed until locking fingers 116 are urged inwardly. While in the locked position, locking pins 114 of lock 110 are received in holes 64 and 68 of locking hole set 66.

As may be seen in FIG. 14, pin 114 received in second locking hole 64 is also received in first locking hole 62 of locking tab 60 to lock lid 14 in a closed position. Locking pin 114 received in the third locking hole 68 provides stability to lock 110 but does not engage lid 14 in the embodiment of the invention depicted in the drawings. In other alternative embodiments, both locking pins 114 may engage lid 14.

It may be understood that lock 110 may be attached to box 10 in two orientations due to the symmetry of locking pins 114, locking fingers 116, and locking hole sets 66. Such symmetry allows lock 110 to be quickly and easily installed on box 10 without concern for the proper alignment of pins 114 and fingers 116.

Figure 13:
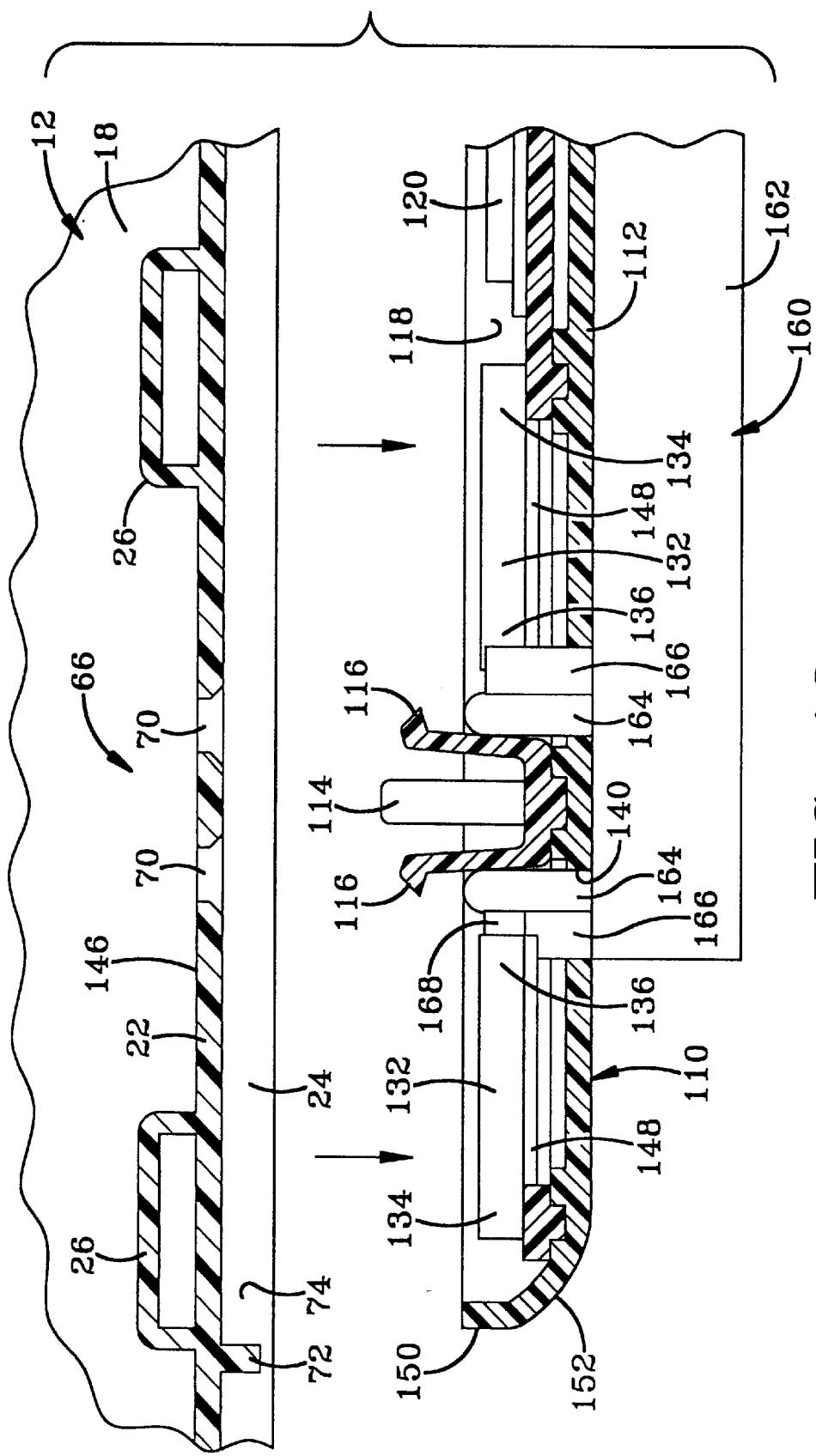
FIG. 13 is a sectional view similar to FIG. 11 with the key in the fully engaged position and the lock completely disengaged from the media storage box.

A key for use with lock 110 is depicted in FIGS. 6 through 9 and is indicated generally at 160. Key 160 includes a spine 162 from which extends key shanks 164. Key shanks 164 are configured to be slidably received in first portion 140 of key hole 130. Each shank 164 has a tooth 166 extending therefrom that is configured to be slidably received in second portion 142 of key hole 130. Each tooth 166 has a chiseled face 168 that engages free end 136 of cantilevered arm 132 when key 160 is inserted into a fully engaged position with lock 110. When fully engaged, each tooth 166 engages cantilevered arm 132 and urges it to one side or the other as depicted in FIG. 16. When key 160 is in the fully engaged position, each shank 164 engages locking finger 116 to urge it inwardly such that lock 110 may be removed from box 10 as depicted in FIGS. 12 and 13. It may be understood that key 160 is also symmetric such that it may be properly inserted into lock 110 in either of two orientations.

It may thus be understood that box 10 may not be opened when lock 110 is in locked engagement with box 10. Lid 14 of box 10 may not be opened because at least one of locking pins 114 extends through front wall 22 of base 12 and at least one locking tab 60 of lid 14. Further, a shoplifter cannot remove EAS tag 120 from lock 110 without either removing or damaging lock 110. Lock 110 may not be removed without key 160 because at least one locking finger 116 lockingly engages front wall 22 of box 10 until urged out of engagement by shanks 164 of key 160. Thus the objectives of the invention are achieved by box 10, lock 110, and key 160.

A second embodiment of a lock for either box 10 or 80 is depicted in FIGS. 17 through 19 and is indicated generally at 210. Lock 210 generally includes a body 212, at least one locking pin 214, and at least one locking finger 216. In general, at least one locking pin 214 prevents box 10 or 80 from being opened when lock 210 lockingly engages box 10 or 80. Locking fingers 216 provide the locked connection between lock 210 and box 10 or 80. Body 212 also defines a storage cavity 218. An EAS tag 220 may be disposed fully within cavity 218 such that no portion of EAS tag 220 protrudes beyond the boundaries of body 212 as is seen in FIGS. 19 and 22. Body 212 also defines a pair of key slots 230 that are disposed on either end of lock 210. Each locking pin 214 is preferably fabricated from a metal that is anchored in body 212 of lock 210. Metal is preferred because it may not easily be sheared but other suitable plastics may be used in place of metal locking pins 214 without departing from the scope of the present invention. Each locking pin 214 is long enough to pass through both front wall 22 and locking tab 60 of box 10 as is specifically depicted in FIG. 25.

Each locking finger 216 is configured to extend into a locking finger hole 70 in front wall 22 of box 10 and engage rear surface 146 thereof as depicted in FIG. 22. Each locking finger 216 is integrally connected to a resilient arm 232 and a pivot arm 234. Locking fingers 216, resilient arms 232, and pivot arms 234 are pivotally carried by body 212 on a pivot pin 236 that is clamped between a first flange 238 and a second flange 240. To allow locking fingers 216 to be pivoted by a key which is generally indicated at 260, a metal clip 242 is carried by pivot arm 234. Clip 242 must be fabricated from a material that is magnetically attractive so that pivot arm 234 may be moved by magnetic force.

In accordance with another object of the present invention, lock 210 may not be easily pried from box 10 when lock 210 is locked onto box 10. As seen in FIGS. 21 and 22, body 212 includes a curved portion 252 that prevents a pry bar from gaining a solid grip on lock 210. Body 212 is also configured to fit closely within lock reception cavity 74 of box 10. In this position, ledges 24 and 46 cooperate with protection ribs 72 to prevent a pry bar from being inserted under lock 210.

Lock 210 is placed into locked engagement with box 10 by aligning locking fingers 216 and locking pins 214 with the holes of locking hole set 66 and pressing lock 210 against box 10. The force causes locking fingers 216 to engage front wall 22 adjacent holes 70 causing resilient arms 232 to flex allowing locking fingers 216 to snap into holes 70 and engage rear surface 146 of front wall 22. Holes 70 may have angled sidewalls to facilitate the engagement. Locking fingers 216 may also have angled edges that cooperate with holes 70. When locking fingers 216 are fully inserted in holes 70, they snap back outwardly due to the resilient force of resilient arms 232. As is seen in FIG. 22, lock 210 may not be removed from box 10 until locking fingers 216 are urged inwardly. While in the locked position, locking pins 214 of lock 210 are received in holes 64 and 68 of locking hole set 66. As seen in FIG. 25, pin 214 received in second locking hole 64 is also received in first locking hole 62 of locking tab 60 to lock lid 14 in a closed position. Locking pin 214 received in third locking hole 68 provides stability to lock 210 but does not engage lid 14 in the embodiment of the invention depicted in the drawings. In other alternative embodiments, both locking pins 214 may engage lid 14.

Lock 210 may be attached to box 10 in two orientations due to the symmetry of locking pins 214, locking fingers 216, and locking hole set 66. Such symmetry allows lock 210 to be quickly and easily installed on box 10 without concern for the proper alignment of pins 214 and fingers 216.

Figure 23:
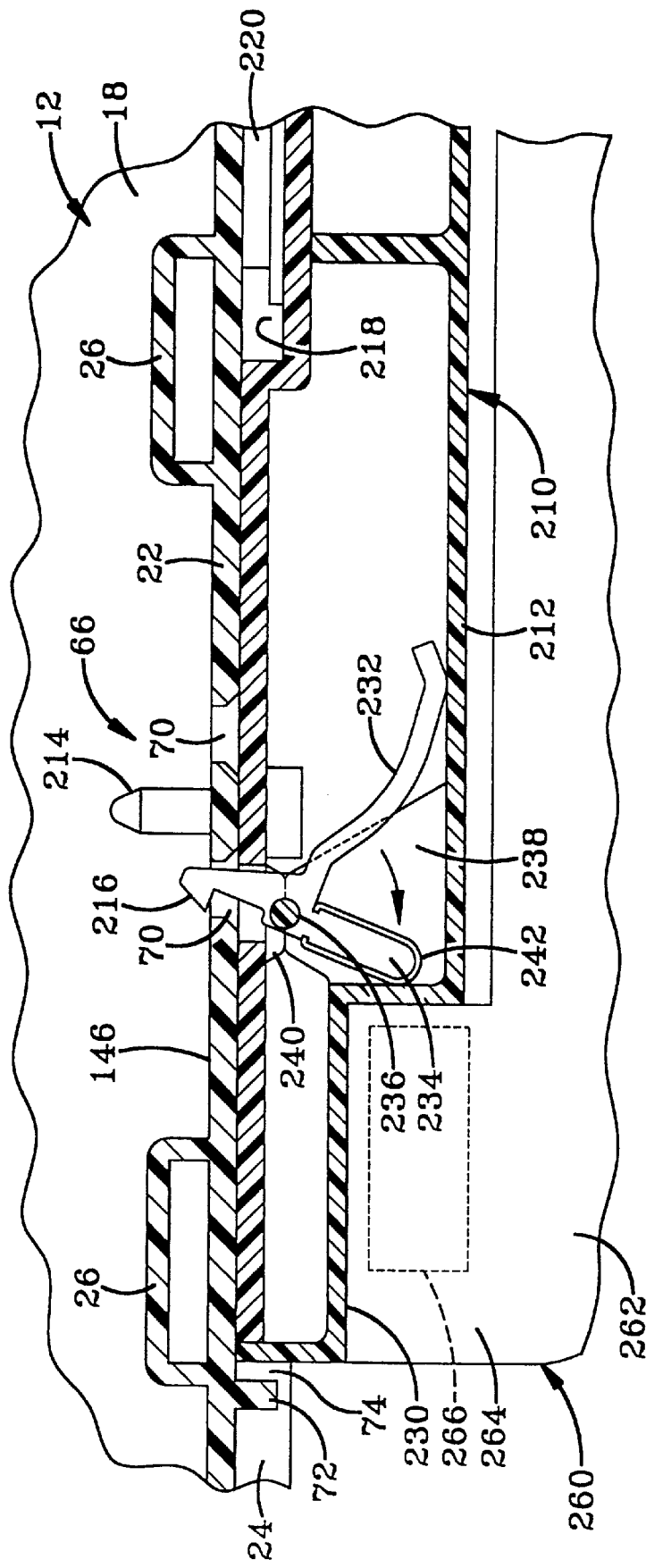
FIG. 23 is a sectional view similar to FIG. 22 with the key of FIG. 20 in a fully engaged position showing the locking finger of the lock disengaged from the locking hole.
Figure 24:
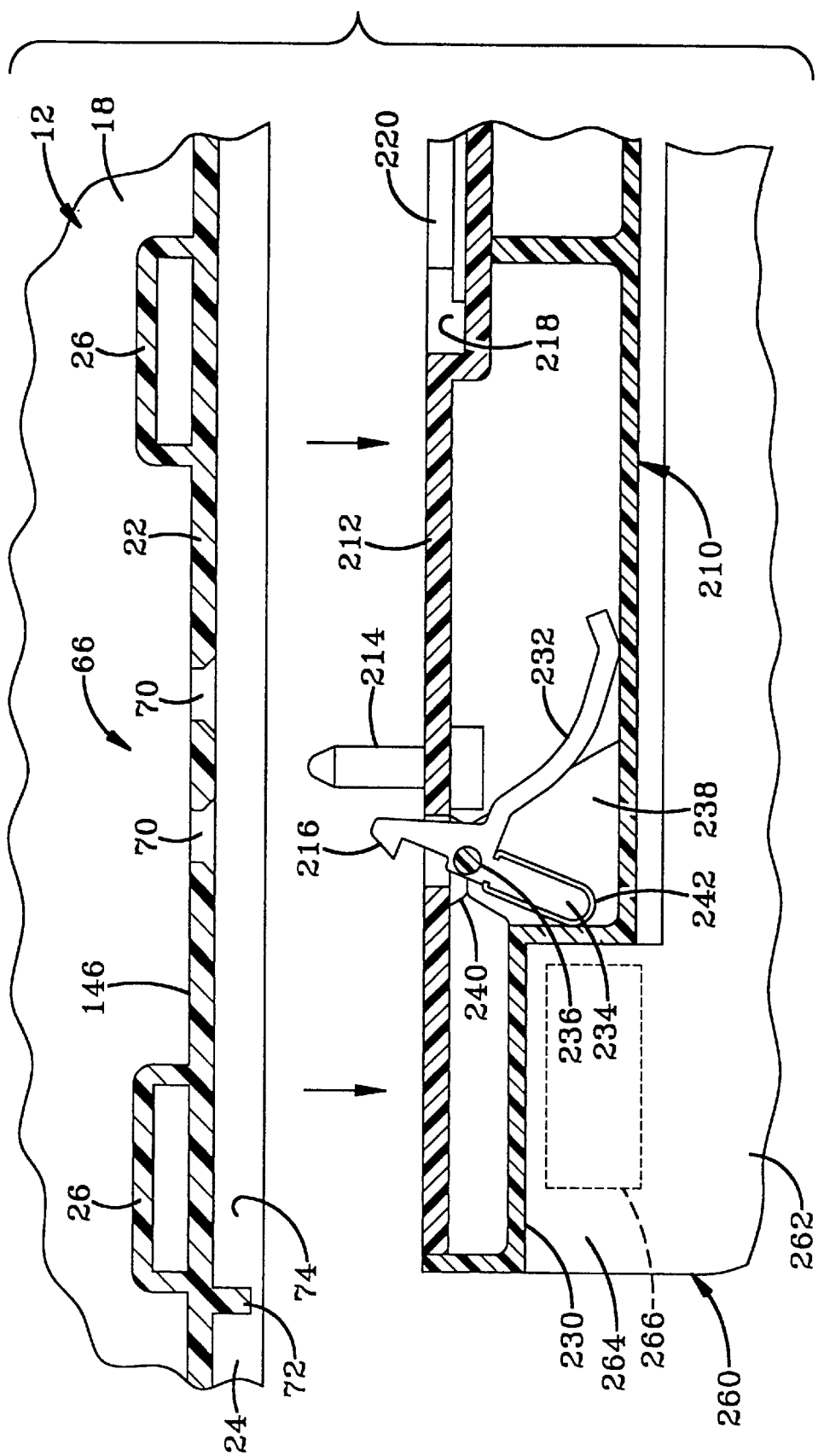
FIG. 24 is a sectional view similar to FIG. 23 with the key of FIG. 20 in the fully engaged position and lock completely disengaged from the media storage box.

A key for use with lock 210 is depicted in FIG. 20 and is indicated generally at 260. Key 260 includes a spine 262 and a pair of arms 264. Each arm 264 carries a magnet 266 that is strong enough to pull pivot arm 234 toward itself while flexing resilient arm 232 to cause locking finger 216 to release wall 22. Magnets 266 are positioned such that their magnetic field does not damage the item of recorded media (not shown) carried in box 10 or EAS tag 220. This protection is provided in part by the configuration of lock body 212 in that it places multiple layers of body 212 material between magnet 266 and box 10. Further protection is provided by the arrangement of magnets 266 such that their strongest magnetic field is directed away from interior of box 10. Spine 262 and arms 264 are configured to place arms 264 within slots 230 when key 260 engages lock 210. This position is depicted in FIG. 23. In this position, magnets 266 attract pivot arms 234 causing locking fingers 216 to disengage wall 22. Magnets 266 are strong enough to flex resilient arms 232. When key 260 is removed from lock 210, resilient arms 232 return to their at rest position and reset lock 210. Key 260 is also symmetric such that it may be properly inserted into lock 210 in either of two orientations.

The improved lockable media storage box with lock and key is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the lockable media storage box with lock and key is constructed and used, the characteristics of the construction, and the advantageous new and useful results obtained; the new and useful structures, devices, elements, arrangements, parts, and combinations are set forth in the appended claims.

What is claimed is:

1. In combination, a media storage box and an EAS tag carrier that is selectively carried by the media storage box, the combination comprising:

the media storage box having at least one wall;

the media storage box being adapted to house recorded media;

the wall having at least one locking finger hole;

the EAS tag carrier having a body and at least one locking finger extending from the body;

the locking finger selectively positionable in said locking hole to hold the EAS tag carrier on the media storage box; and and EAS tag carried by the EAS tag carrier.

2. In combination, a media storage box and an EAS tag carrier that is selectively carried by the media storage box, the combination comprising:

the wall having at least one locking finger hole;

the media storage box including a base and a lid connected to the base and movable between open and closed positions;

the base having a front wall extending from a bottom wall;

the bottom wall having a perimeter;

the front wall of the base extending from the bottom wall at a distance inward of the perimeter to form a lower ledge;

the lid having a front wall extending from an upper wall;

the upper wall having a perimeter;

the front wall of the lid extending from the upper wall at a distance inward of the perimeter to form an upper ledge; and a pair of protection ribs connected to one of the front walls;

each of the protection ribs extending substantially between the upper and lower ledges when the lid is in the closed position;

the ledges and the ribs defining a reception cavity;

the carrier disposed at least partially within the reception cavity when connected to the base;

one of the walls having at least one locking finger hole;

the EAS tag carrier having a body and at least one locking finger extending from the body;

the locking finger selectively positionable in said locking hole to hold the EAS tag carrier on the media storage box; and an EAS tag carried by the EAS tag carrier.

3. In combination, a media storage box and an EAS tag carrier that is selectively carried by the media storage box, the combination comprising:

the media storage box including a base and a lid connected to the base and movable between open and closed positions;

the base having a side wall extending form a bottom wall;

the bottom wall having a perimeter;

the side wall of the base extending from the bottom wall at a distance inward of the perimeter to form a lower ledge;

the lid having a side wall extending from an upper wall;

the upper wall having a perimeter;

the side wall of the lid extending from the upper wall at a distance inward of the perimeter to form an upper ledge;

a pair of protection ribs connected to one of the side walls;

each of the protection ribs extending substantially between the upper and lower ledges when the lid is in the closed position;

the ledges and the ribs defining a reception cavity;

the carrier disposed at least partially within the reception cavity when connected to the base;

one of the walls having at least one locking finger hole;

the EAS tag carrier having a body and at least one locking finger extending from the body;

the locking finger selectively positionable in said locking hole to hold the EAS tag carrier on the media storage box; and an EAS tag carried by the EAS tag carrier.

4. The combination of claim 1, wherein the base has at least two locking finger holes and the EAS tag carrier has at least two locking fingers projecting from the body; the locking fingers being simultaneously received in the locking finger holes to connect the EAS tag carrier to the media storage box.

5. The combination of claim 4, wherein the locking finger holes and locking fingers are symmetric allowing the EAS tag carrier to be mounted with either locking finger disposed in either locking finger hole.

6. The combination of claim 1, in further combination with a key configured to engage the locking finger and release the locking finger from the box.

7. In combination, a media storage box and an EAS tag carrier that is selectively carried by the media storage box, the combination comprising:

the media storage box having at least one wall;

the wall having at least one locking finger hole;

the EAS tag carrier having a body and at least one locking finger extending from the body;

the locking finger selectively positionable in said locking hole to hold the EAS tag carrier on the media storage box; and an EAS tag carried by the EAS tag carrier;

the carrier being free of elements that project beyond the perimeter of the wall having the locking finger hole.

8. A recorded media storage box comprising:

a base having first and second sidewalls and a front wall;

a lid connected to the base and moveable between open and closed positions;

a lid having first and second sidewalls and a front wall;

the sidewalls and front walls of the base and lid being adjacent when the lid is in the closed position;

one of the sidewalls and front wall of the lid having a first locking hole therein;

one of the sidewalls and front wall of the base having a second locking hole therein; and the first locking hole being aligned with the second locking hole when the lid is in the closed position;

the first locking hole having a centerline;

the second locking hole having a centerline;

the centerline of the first locking hole being substantially perpendicular to one of the sidewalls and front wall of the lid;

the centerline of the second locking hole being substantially perpendicular to one of the sidewalls and front wall of the base.

9. A recorded media storage box comprising:

a base having first and second sidewalls and a front wall;

a lid connected to the base and moveable between open and closed positions;

the lid having first and second sidewalls and a front wall;

the sidewalls and front walls of the base and lid being adjacent when the lid is in the closed position;

one of the sidewalls and front wall of the lid having a first locking hole therein;

one of the sidewalls and front wall of the base having a second locking hole therein;

the first locking hole being aligned with the second locking hole when the lid is in the closed position; and an EAS tag carrier; the carrier having a projecting member received in the first and second locking holes.

10. The box of claim 8, wherein one of the sidewalls and the front wall of the lid has a third locking hole therein; one of the sidewalls and the front wall of the base has a fourth locking hole therein; the third and fourth locking holes being aligned when the lid is in the closed position.

11. A recorded media storage box comprising:

a base having first and second sidewalls and a front wall;

a lid connected to the base and moveable between open and closed positions;

the lid having first and second sidewalls and a front wall;

the sidewalls and front walls of the base and lid being adjacent when the lid is in the closed position;

one of the sidewalls and front wall of the lid having a first locking hole therein;

one of the sidewalls and front wall of the base having a second locking hole therein; and the first locking hole being aligned with the second locking hole when the lid is in the closed position the base having a bottom wall;

the bottom wall having a perimeter;

the front wall of the base extending from the bottom wall at a distance inward of the perimeter to form a lower ledge;

the lid having an upper wall;

the upper wall having a perimeter;

the front wall of the lid extending from the upper wall at a distance inward of the perimeter to form an upper ledge;

a pair of protection ribs connected to one of the front walls;

each of the protection ribs extending substantially between the upper and lower ledges when the lid is in the closed position; and the ledges and the ribs defining a reception cavity.

12. A recorded media storage box comprising:

a base having first and second sidewalls and a front wall;

a lid connected to the base and moveable between open and closed positions;

the lid having first and second sidewalls and a front wall;

the sidewalls and front walls of the base and lid being adjacent when the lid is in the closed position;

one of the sidewalls and frontwall of the lid having a first locking hole therein;

one of the sidewalls and front wall of the base having a second locking hole therein; and the first locking hole being aligned with the second locking hole when the lid is in the closed position;

the base having a bottom wall;

the bottom wall having a perimeter;

the side wall of the base extending from the bottom wall at a distance inward of the perimeter to form a lower ledge;

the lid having an upper wall;

the upper wall having a perimeter;

the side wall of the lid extending from the upper wall at a distance inward of the perimeter to form an upper ledge;

a pair of protection ribs connected to one of the side walls;

each of the protection ribs extending substantially between the upper and lower ledges when the lid is in the closed position; and the ledges and the ribs defining a reception cavity.

* * * * *

(12) REEXAMINATION CERTIFICATE (4756th)

United States Patent
Burdett et al.

(10) Number: US 6,135,280 C1
(45) Certificate Issued: *Mar. 25, 2003

(54) LOCKABLE MEDIA STORAGE BOX WITH LOCK AND KEY

(75) Inventors: Ronald K. Burdett, Strasburg, OH (US); Dennis D. Belden, Jr., Canton, OH (US); Nicholas M. Sedon, Massillon, OH (US)

(73) Assignee: Nexpak Corp., North Canton, OH (US)

Reexamination Request:
No. 90/006,021, May 25, 2001
No. 90/006,048, Jun. 29, 2001

Reexamination Certificate for:
Patent No.: 6,135,280
Issued: Oct. 24, 2000
Appl. No.: 09/317,554
Filed: May 24, 1999

( * ) Notice: This patent is subject to a terminal disclaimer.

Related U.S. Application Data

(63) Continuation of application No. 09/015,085, filed on Jan. 29, 1998, now Pat. No. 5,944,185.

(51) Int. Cl.[7] ............................................. B65D 85/575
(52) U.S. Cl. .................................. 206/387.11; 206/807
(58) Field of Search .................... 70/57.1, 63; 206/1.5, 206/303, 307, 308.1, 308.2, 387.11, 472, 807; 220/315, 324, 326, 327

(56) References Cited

U.S. PATENT DOCUMENTS

| | | |
|---|---|---|
| 517,729 A | 4/1894 | Cable |
| 1,510,632 A | 10/1924 | Nutry |
| 1,626,898 A | 5/1927 | Welk |
| 1,707,225 A | 4/1929 | Jackson |
| 2,393,034 A | 1/1946 | Ellis et al. .................... 220/31 |
| 2,730,392 A | 1/1956 | Thiebaud .................... 292/201 |
| 2,825,483 A | 3/1958 | Maron, Jr. |
| 2,916,901 A | 12/1959 | Claud-Mantle ............... 70/76 |
| 3,230,749 A | 1/1966 | Manthorne .................... 70/421 |
| 3,232,421 A | 2/1966 | Young .......................... 206/52 |
| 3,495,716 A | 2/1970 | Gregory ....................... 211/4 |
| 3,497,908 A | 3/1970 | Zamarra ...................... 16/171 |
| 3,515,423 A | 6/1970 | De Smidt |
| 3,685,684 A | 8/1972 | Schindler et al. |
| 3,828,922 A | 8/1974 | Holkestad ................... 206/1.5 |
| 3,837,525 A | 9/1974 | Kobayashi |
| 3,855,827 A | 12/1974 | Hallman et al. ............. 70/134 |
| 3,871,516 A | 3/1975 | Holkestad et al. ....... 206/45.31 |
| 3,933,240 A | 1/1976 | Humble |

(List continued on next page.)

FOREIGN PATENT DOCUMENTS

| | | |
|---|---|---|
| DE | 3522252 A1 | 1/1987 |
| DE | 3923107 C2 | 1/1991 |
| EP | 0 098 216 A1 | 1/1984 |
| EP | 0 211 088 A1 | 2/1987 |
| EP | 0 308 810 A2 | 3/1989 |
| EP | 0 312 172 A1 | 4/1989 |
| EP | 0 414 306 A1 | 2/1991 |
| EP | 0 483 422 A1 | 5/1992 |
| EP | 0 616 103 A1 | 3/1993 |
| EP | 0 589551 A1 | 3/1994 |
| FR | 2 628 250 A1 | 9/1989 |
| FR | 2 628 717 A1 | 9/1989 |
| NL | 1000900 C | 1/1997 |
| WO | WO 90/04548 | 5/1990 |
| WO | WO 00/17877 | 3/2000 |

*Primary Examiner*—Jim Foster

(57) ABSTRACT

A lockable media storage box and lock and key combination includes a box having a base and a lid hingedly connected to the base and movable between opened and closed positions. A locking tab extends from the lid. The locking tab has a first hole therein. The base has a second hole therein. The first and second holes are aligned when the lid is in the closed position. A lock having at least one locking finger and at least one locking pin is attachable to the box by the locking finger. When the lock is attached to the box, the locking pin is disposed in the first and second holes to the prevent lid from being opened. Lock carries an EAS tag in a manner such that it cannot be easily removed.

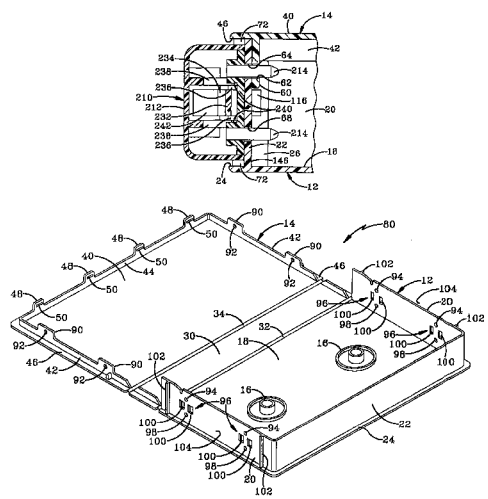

U.S. PATENT DOCUMENTS

| | | | |
|---|---|---|---|
| 3,933,381 A | 1/1976 | Schurman | |
| 3,951,264 A | 4/1976 | Heidecker et al. | 206/444 |
| 3,958,125 A | 5/1976 | Zechmair et al. | |
| 3,994,416 A | 11/1976 | Mulligan | 220/338 |
| 4,084,694 A | 4/1978 | Lainez et al. | 206/444 |
| 4,109,821 A | 8/1978 | Lutz | 220/337 |
| 4,153,178 A | 5/1979 | Weavers | |
| RE30,184 E | 1/1980 | Ackeret | 206/387 |
| 4,191,292 A | 3/1980 | Schweizer | 206/387 |
| 4,204,724 A | 5/1980 | Bauer et al. | |
| 4,239,108 A | 12/1980 | Coleman et al. | 206/312 |
| 4,266,784 A | 5/1981 | Torrington | 369/77 |
| 4,285,429 A | 8/1981 | MacTavish | 206/387 |
| 4,291,817 A | 9/1981 | Spitzer et al. | |
| 4,379,507 A | 4/1983 | Llabres | 206/444 |
| 4,381,836 A | 5/1983 | Rivkin et al. | 206/387 |
| 4,390,198 A | 6/1983 | Selinko | |
| 4,436,201 A | 3/1984 | Inaba | 206/444 |
| 4,453,743 A | 6/1984 | Sanders et al. | 281/18 |
| 4,463,849 A | 8/1984 | Prusak et al. | 206/307 |
| 4,463,850 A | 8/1984 | Gorog | 206/309 |
| 4,466,540 A | 8/1984 | Lotrous et al. | 206/387 |
| 4,469,225 A * | 9/1984 | Takahashi | 206/387.1 |
| 4,508,217 A | 4/1985 | Long et al. | 206/45.18 |
| 4,538,730 A | 9/1985 | Wu | |
| 4,545,502 A | 10/1985 | Reuter | |
| 4,567,983 A | 2/1986 | Morris | 206/387 |
| 4,572,369 A | 2/1986 | Morris | |
| 4,589,549 A | 5/1986 | Hehn | |
| 4,609,105 A | 9/1986 | Manes et al. | 206/444 |
| 4,613,044 A | 9/1986 | Saito et al. | 206/444 |
| 4,617,655 A | 10/1986 | Aldenhoven | 369/291 |
| 4,634,004 A | 1/1987 | Mortensen | 206/387 |
| 4,658,955 A * | 4/1987 | Eichner | 206/1.5 |
| 4,674,303 A | 6/1987 | Salcone, II | |
| 4,705,166 A | 11/1987 | Ackeret | 206/309 |
| 4,709,813 A | 12/1987 | Wildt | 206/312 |
| 4,714,161 A | 12/1987 | Thorud | 206/387 |
| 4,718,547 A | 1/1988 | MacTavish | 206/309 |
| 4,722,439 A | 2/1988 | Gorbecker et al. | 206/309 |
| 4,747,484 A | 5/1988 | Ackeret | |
| 4,750,618 A | 6/1988 | Schubert | 206/309 |
| 4,753,347 A * | 6/1988 | Bellante | 206/472 |
| 4,759,442 A | 7/1988 | Gregerson et al. | 206/387 |
| 4,760,914 A | 8/1988 | Gelardi et al. | |
| 4,764,146 A | 8/1988 | Auer et al. | |
| 4,805,769 A | 2/1989 | Solti et al. | |
| 4,805,770 A | 2/1989 | Grobecker et al. | 206/309 |
| 4,807,749 A | 2/1989 | Ackeret | 206/387 |
| 4,819,797 A | 4/1989 | Holmgren | |
| 4,834,238 A | 5/1989 | Hehn et al. | |
| 4,860,897 A | 8/1989 | Fowler et al. | 206/444 |
| 4,865,190 A | 9/1989 | Gregerson et al. | |
| 4,871,064 A * | 10/1989 | Hehn et al. | 206/472 |
| 4,921,097 A | 5/1990 | Finke et al. | 206/387 |
| 4,941,588 A | 7/1990 | Flider | |
| 4,966,020 A | 10/1990 | Fotheringham et al. | 70/276 |
| 4,972,690 A | 11/1990 | O'Sullivan | 70/63 |
| 4,974,740 A | 12/1990 | Niles | |
| 5,007,256 A | 4/1991 | Lowe | 70/14 |
| 5,031,756 A | 7/1991 | Buzzard et al. | |
| 5,039,982 A | 8/1991 | Bruhwiler | 340/572 |
| 5,076,460 A | 12/1991 | Hussell | 220/338 |
| 5,103,978 A | 4/1992 | Secor | 206/387 |
| 5,133,470 A | 7/1992 | Abrams et al. | |
| 5,147,034 A | 9/1992 | Broadhead et al. | 206/1.5 |
| 5,191,983 A | 3/1993 | Hardy | 211/40 |
| 5,193,371 A | 3/1993 | Yamane | 70/276 |
| 5,195,595 A | 3/1993 | Nakagawa | |
| 5,205,405 A | 4/1993 | O'Brien et al. | 206/310 |
| 5,209,086 A | 5/1993 | Bruhwiler | 70/57.1 |
| 5,211,283 A | 5/1993 | Weisburn et al. | 206/1.5 |
| 5,213,209 A | 5/1993 | Song | 206/309 |
| 5,215,188 A | 6/1993 | Wittman | |
| 5,219,417 A | 6/1993 | O'Brien et al. | 206/312 |
| 5,236,081 A | 8/1993 | Fitzsimmons et al. | 206/44 R |
| 5,259,498 A | 11/1993 | Weisburn et al. | 206/45.15 |
| 5,272,832 A | 12/1993 | Marshall et al. | |
| 5,289,914 A | 3/1994 | Holmgren | 206/1.5 |
| 5,295,576 A | 3/1994 | Wang | 206/309 |
| 5,297,672 A | 3/1994 | MacTavish | 206/1.5 |
| 5,305,873 A | 4/1994 | Joyce | 206/1.5 |
| 5,360,107 A | 11/1994 | Chasin et al. | 206/313 |
| 5,368,162 A | 11/1994 | Holmgren | |
| 5,375,708 A | 12/1994 | Wittman | 206/315.1 |
| 5,375,712 A | 12/1994 | Weisburn | |
| 5,384,103 A | 1/1995 | Miller | |
| 5,385,235 A | 1/1995 | Ikebe et al. | 206/308.1 |
| 5,390,515 A * | 2/1995 | Essick | 206/1.5 |
| 5,417,319 A | 5/1995 | Chalberg et al. | 206/1.5 |
| 5,460,266 A * | 10/1995 | Mundorf et al. | 206/309 |
| 5,468,031 A | 11/1995 | Holmgren | 292/81 |
| 5,524,752 A | 6/1996 | Mazzucchelli | |
| 5,528,914 A * | 6/1996 | Nguyen et al. | 70/57.1 |
| 5,533,619 A | 7/1996 | Ziegler | 206/387.12 |
| 5,588,315 A | 12/1996 | Holmgren | |
| 5,597,068 A | 1/1997 | Weisburn et al. | 206/308.1 |
| 5,598,728 A | 2/1997 | Lax | |
| 5,601,188 A * | 2/1997 | Dressen et al. | 206/308.2 |
| 5,636,535 A * | 6/1997 | Shimada | 206/387.11 |
| 5,636,737 A | 6/1997 | Marsilio | |
| 5,680,782 A | 10/1997 | Komatsu et al. | |
| 5,718,332 A | 2/1998 | Tachibana | 206/308.2 |
| 5,730,283 A | 3/1998 | Lax | |
| 5,732,822 A | 3/1998 | Mitsuyama | 206/387.11 |
| 5,762,187 A * | 6/1998 | Belden, Jr. et al. | 206/387.11 |
| 5,768,922 A | 6/1998 | Lax | |
| 5,769,218 A | 6/1998 | Yabe | |
| 5,779,039 A | 7/1998 | Ambrus | 206/308.2 |
| 5,788,068 A | 8/1998 | Fraser et al. | |
| 5,799,782 A | 9/1998 | Gelardi | 206/308.1 |
| 5,802,890 A | 9/1998 | Espada-Velasco | 70/57.1 |
| 5,823,341 A * | 10/1998 | Nakasuji | 206/387.11 |
| 5,850,752 A | 12/1998 | Lax | 70/276 |
| 5,901,840 A | 5/1999 | Nakasuji | 206/1.5 |
| 5,944,173 A | 8/1999 | Boire et al. | 206/1.5 |
| 5,944,185 A | 8/1999 | Burdett et al. | |
| 5,946,290 A | 8/1999 | Mizutani et al. | 369/291 |
| 5,988,376 A | 11/1999 | Lax | 206/308.2 |
| 6,082,156 A | 7/2000 | Bin | 70/57.1 |
| 6,102,200 A | 8/2000 | Dressen et al. | 206/308.2 |
| 6,135,280 A | 10/2000 | Burdett et al. | |
| 6,182,480 B1 | 2/2001 | Kim | |
| 2002/0023853 A1 | 2/2002 | Lax et al. | |

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11 and 12 is confirmed.

Claims 1, 4 and 7–10 are cancelled.

Claims 2, 3, 5 and 6 are determined to be patentable as amended.

2. In combination, a media storage box and an EAS tag carrier that is selectively carried by the media storage box, the combination comprising:

[the wall having at least one locking finger hole;]
the media storage box including a base and a lid connected to the base and movable between open and closed positions;
the base having a front wall extending from a bottom wall;
the bottom wall having a perimeter;
the front wall of the base extending from the bottom wall at a distance inward of the perimeter to form a lower ledge;
the lid having a front wall extending from an upper wall;
the upper wall having a perimeter;
the front wall of the lid extending from the upper wall at a distance inward of the perimeter to form an upper ledge; and
a pair of protection ribs connected to one of the front walls;
each of the protection ribs extending substantially between the upper and lower ledges when the lid is in the closed position;
the ledges and ribs defining a reception cavity;
the carrier disposed at least partially within the reception cavity when connected to the base;
one of the walls having at least one locking finger hole;
the EAS tag carrier having a body and at least one locking finger extending from the body;
the locking finger selectively positionable in said locking *finger* hole to hold the EAS tag carrier on the media storage box; and
an EAS tag carried by the EAS tag carrier.

3. In combination, a media storage box and an EAS tag carrier that is selectively carried by the media storage box, the combination comprising:
the media storage box including a base and a lid connected to the base and movable between open and closed positions;
the base having a side wall extending [form] *from* a bottom wall;
the bottom wall having a perimeter;
the side wall of the base extending from the bottom wall at a distance inward of the perimeter to form a lower ledge;
the lid having a side wall extending from an upper wall;
the upper wall having a perimeter;
the side wall of the lid extending from the upper wall at a distance inward of the perimeter to form an upper ledge;
a pair of protection ribs connected to one of the side walls;
each of the protection ribs extending substantially between the upper and lower ledges when the lid is in the closed position;
the ledges and the ribs defining a reception cavity;
the carrier disposed at least partially within the reception cavity when connected to the base;
one of the walls having at least one locking finger hole;
the EAS tag carrier having a body and at least one locking finger extending from the body;
the locking finger selectively positionable in said locking *finger* hole to hold the EAS tag carrier on the media storage box; and
an EAS tag carried by the EAS tag carrier.

5. [The] *In* combination [of claim 4, wherein], *a media storage box and an EAS tag carrier that is selectively carried by the media storage box, the combination comprising:*
*the media storage box having at least one wall;*
*the media storage box being adapted to house recorded media;*
*the wall having at least one locking finger hole;*
*the EAS tag carrier having a body and at least one locking finger extending from the body;*
*the locking finger selectively positionable in said locking finger hole to hold the EAS tag carrier on the media storage box;*
*an EAS tag carried by the EAS tag carrier*
the media storage box having a base; the base having at least two locking finger holes and the EAS tag carrier having at least two locking fingers projecting from the body; the locking fingers being simultaneously received in the locking finger holes to connect the EAS tag carrier to the media storage box;
the locking finger holes and locking fingers are symmetric allowing the EAS tag carrier to be mounted with either locking finger disposed in either locking finger hole.

6. [The] *In* combination [of claim 1,] *, a media storage box and an EAS tag carrier that is selectively carried by the media storage box, the combination comprising:*
*the media storage box having at least one wall;*
*the media storage box being adapted to house recorded media;*
*the wall having at least one locking finger hole;*
*the EAS tag carrier having a body and at least one locking finger extending from the body;*
*the locking finger selectively positionable in said locking finger hole to hold the EAS tag carrier on the media storage box;*
*an EAS tag carried by the EAS tag carrier;*
in further combination with a key configured to engage the locking finger and release the locking finger from the box.

* * * * *